United States Patent [19]

Becker et al.

[11] Patent Number: 5,124,822
[45] Date of Patent: Jun. 23, 1992

[54] VARISTOR DRIVEN LIQUID CRYSTAL DISPLAY

[75] Inventors: Paul Becker, San Bruno; Philip J. Jones, Menlo Park; A. Brian Macknick, Los Altos; Lawrence J. White, Newark; Mark Thompson, San Carlos; Justin N. Chiang, Newark, all of Calif.

[73] Assignee: Raychem Corporation, Menlo Park, Calif.

[21] Appl. No.: 520,685

[22] Filed: May 8, 1990

[51] Int. Cl.$^5$ ................................ G02F 1/13
[52] U.S. Cl. ............................ 359/58; 359/51; 359/68; 359/70
[58] Field of Search ............ 350/333, 334, 336, 332, 350/339 R; 340/719, 783, 784; 338/21; 252/518, 519

[56] References Cited

U.S. PATENT DOCUMENTS

| | | | |
|---|---|---|---|
| 4,033,906 | 7/1977 | Nagasawa et al. | 252/521 |
| 4,383,237 | 5/1983 | Eda et al. | 338/21 |
| 4,403,217 | 9/1983 | Becker et al. | 350/333 |
| 4,460,623 | 7/1984 | Levinson | 350/339 R |
| 4,490,014 | 12/1984 | Levinson | 350/334 |
| 4,525,709 | 6/1985 | Hareng et al. | 340/719 |
| 4,856,876 | 8/1989 | Fergason | 350/347 V |
| 4,996,510 | 2/1991 | Becker et al. | 338/21 |

FOREIGN PATENT DOCUMENTS 2525054 12/1975 Fed. Rep. of Germany.
2512239 3/1983 France.

Primary Examiner—Andrew J. James
Assistant Examiner—Tan Ho
Attorney, Agent, or Firm—Yuan Chao; Herb Burkard

[57] ABSTRACT

A liquid crystal display comprises (a) a first transparent base; (b) a plurality of first picture electrodes on the first transparent base; (c) a plurality of data lines for supplying electrical signals to the first picture electrodes; (d) a second transparent base, parallel to and spaced apart from the first transparent base; (e) a plurality of second picture electrodes on the second transparent base; (f) a plurality of varistor elements made of a varistor material comprising zinc oxide as a primary metal oxide and cobalt and praseodymium oxides as additive metal oxides, in amounts of between 0.1 and 8.0 atom % cobalt and between 0.08 and 8.0 atom % praseodymium, one varistor element being associated with and in electrical contact each second picture electrode; (g) a plurality of scan lines for supplying electrical signals to the second picture electrodes via the respective associated varistor elements; and (h) electrooptically active liquid crystal material between the first and second picture electrodes. In a preferred embodiment, the plurality of varistor elements is in the form of a varistor array comprising an integral body of varistor material having two major opposing faces, one of the opposing faces having an array of indentations thereon, each indentation defining a varistor element.

15 Claims, 9 Drawing Sheets

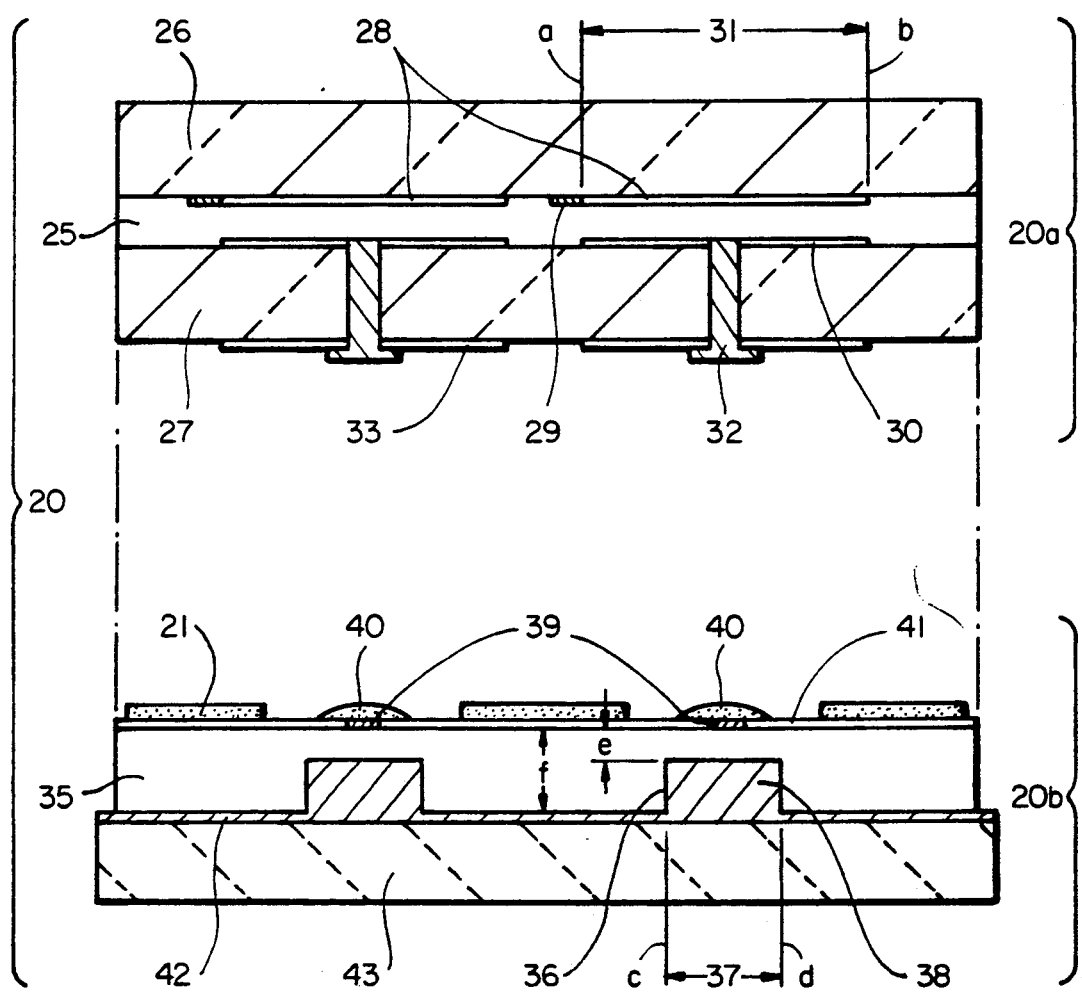
FIG_1

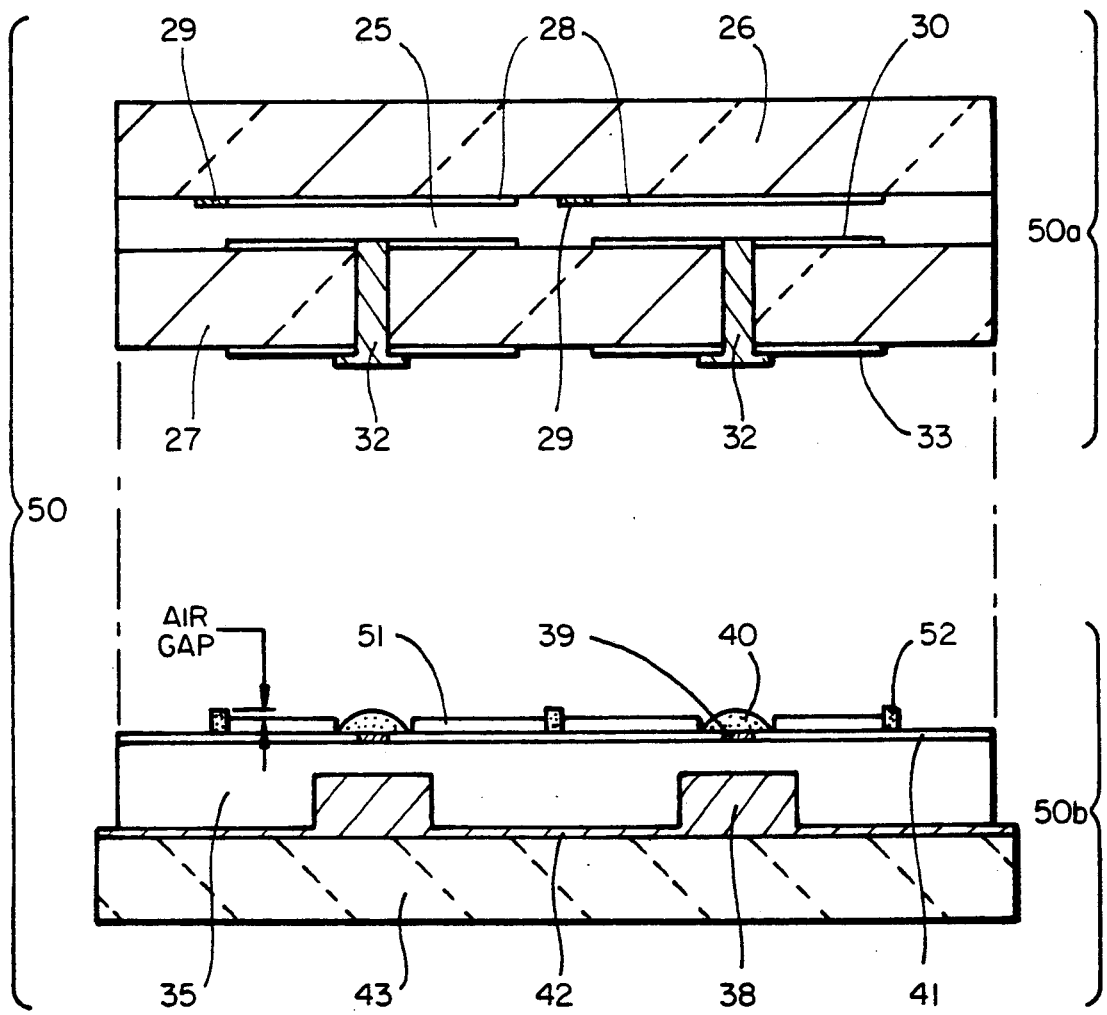
FIG_2

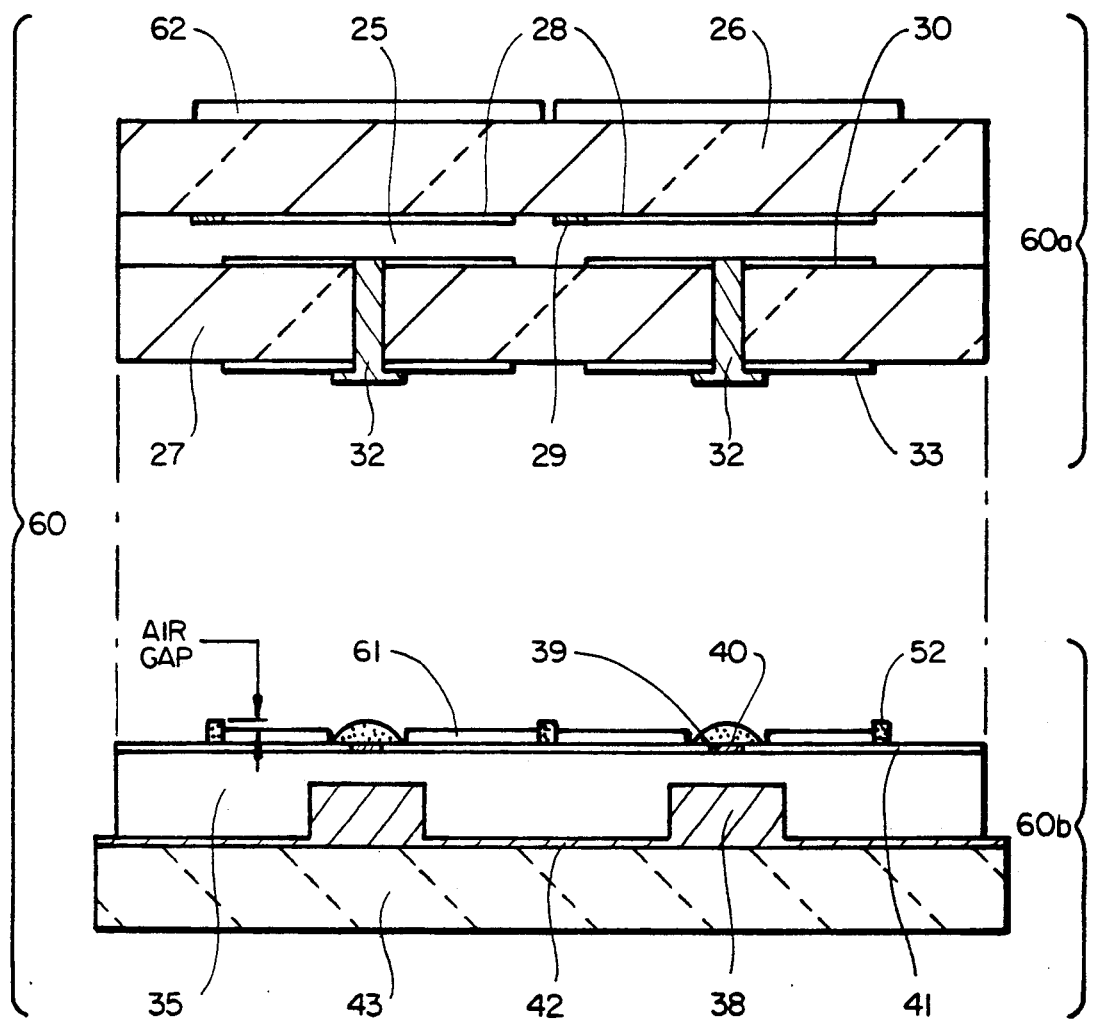
FIG_3

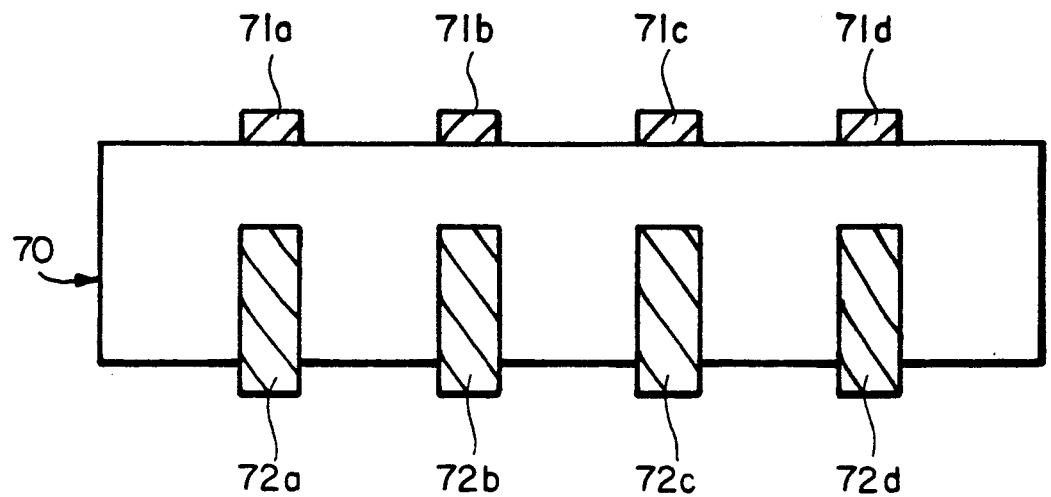
*FIG_4a*
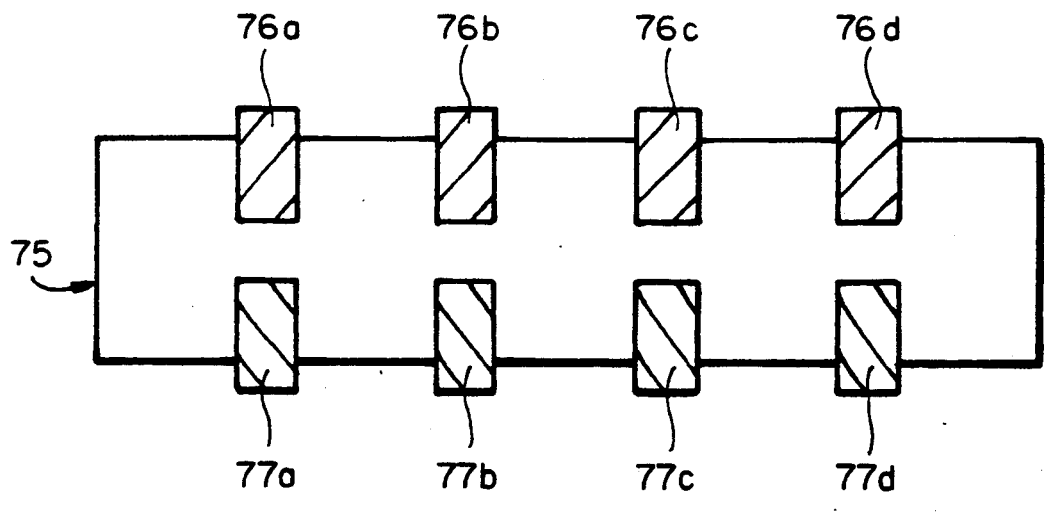
*FIG_4b*

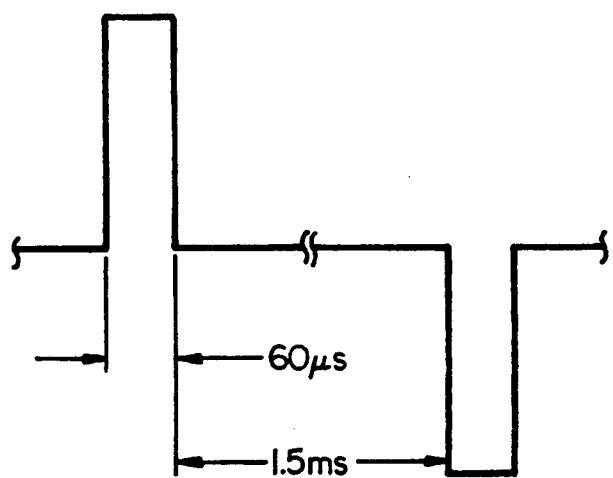
FIG_5
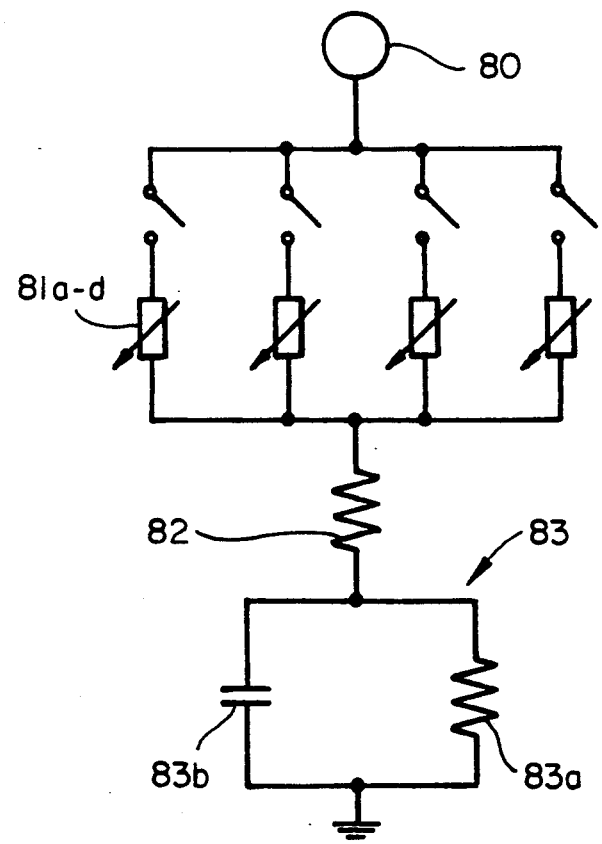
FIG_7

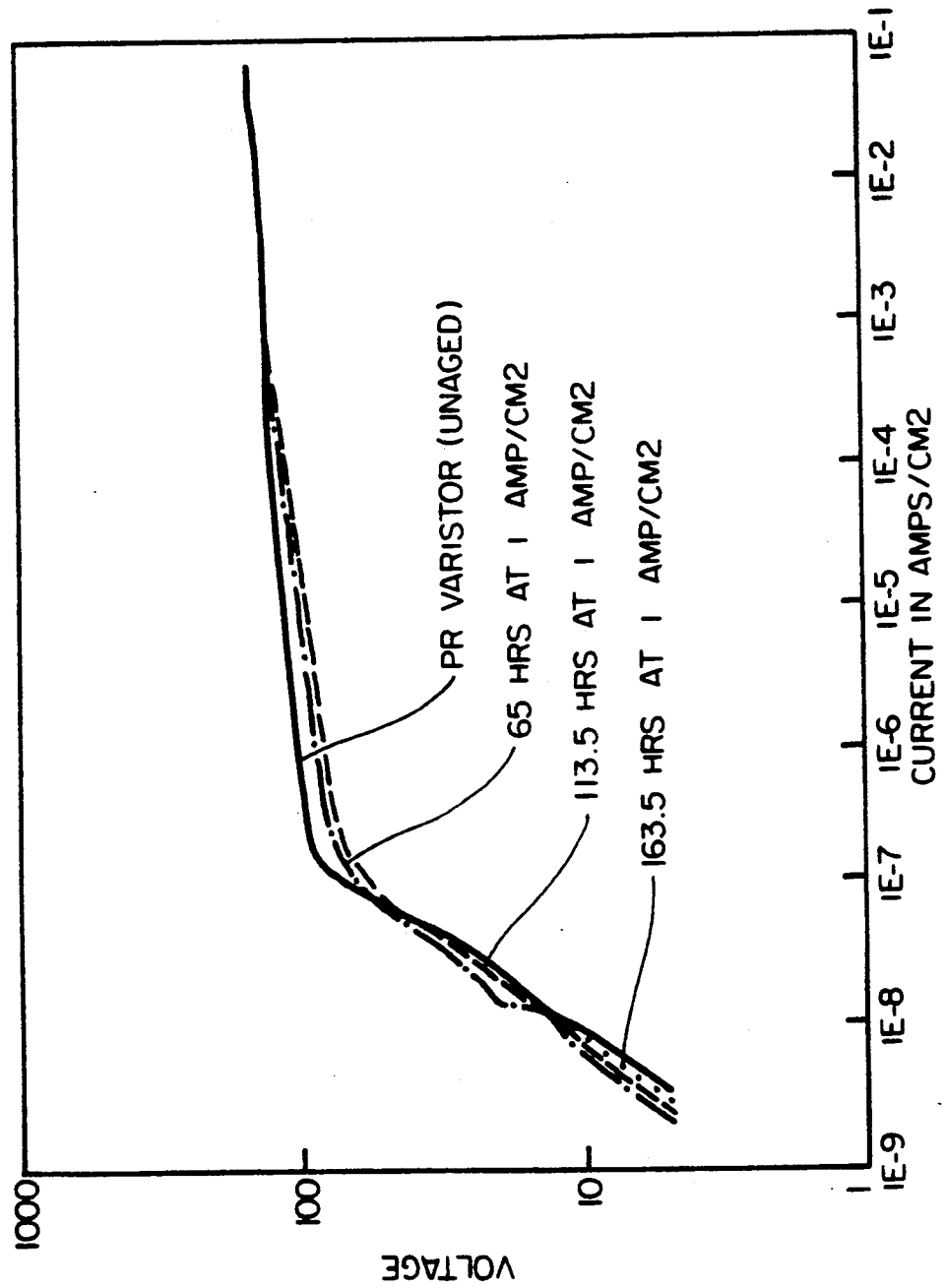
FIG_6a

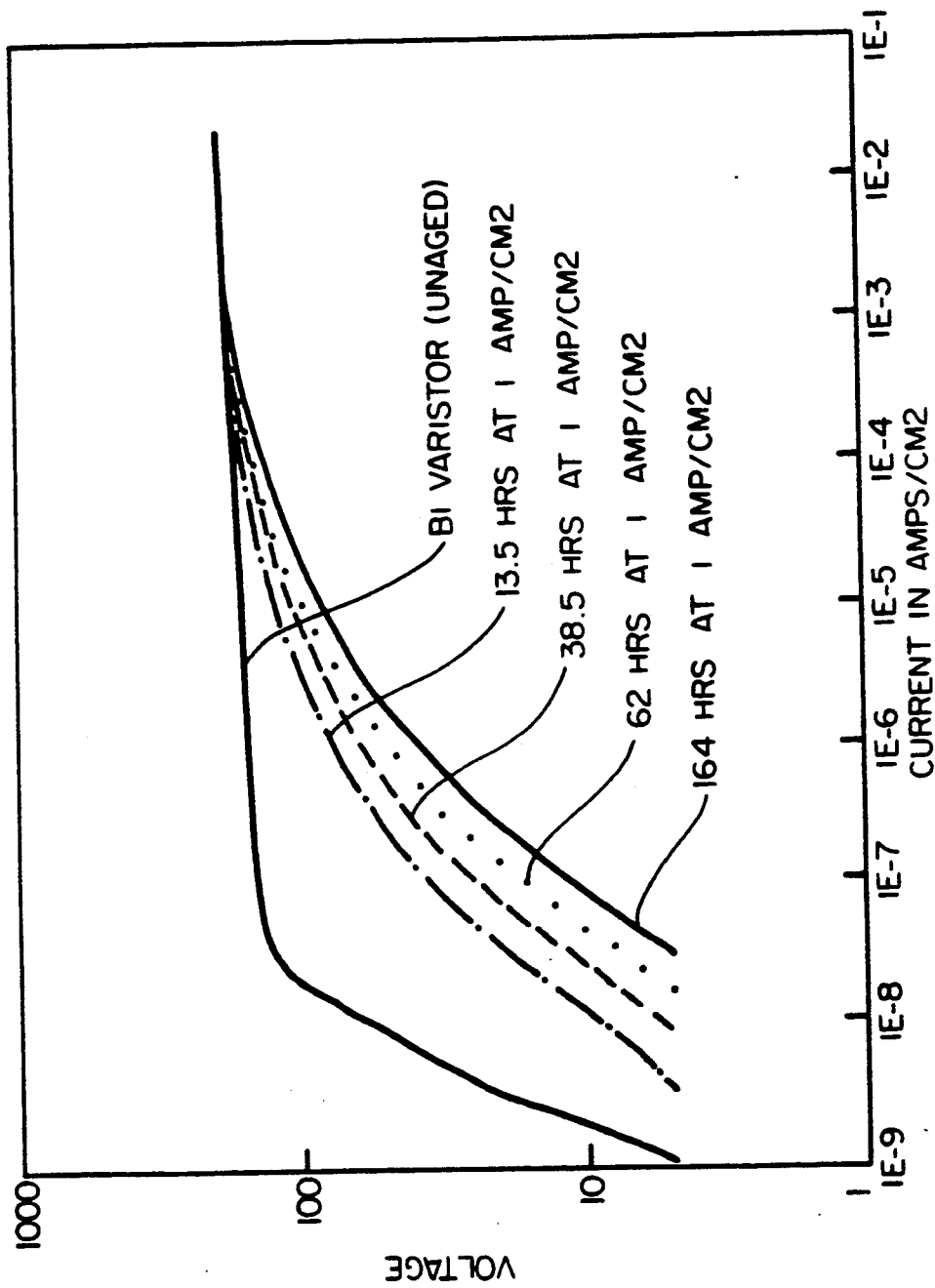
FIG_6b

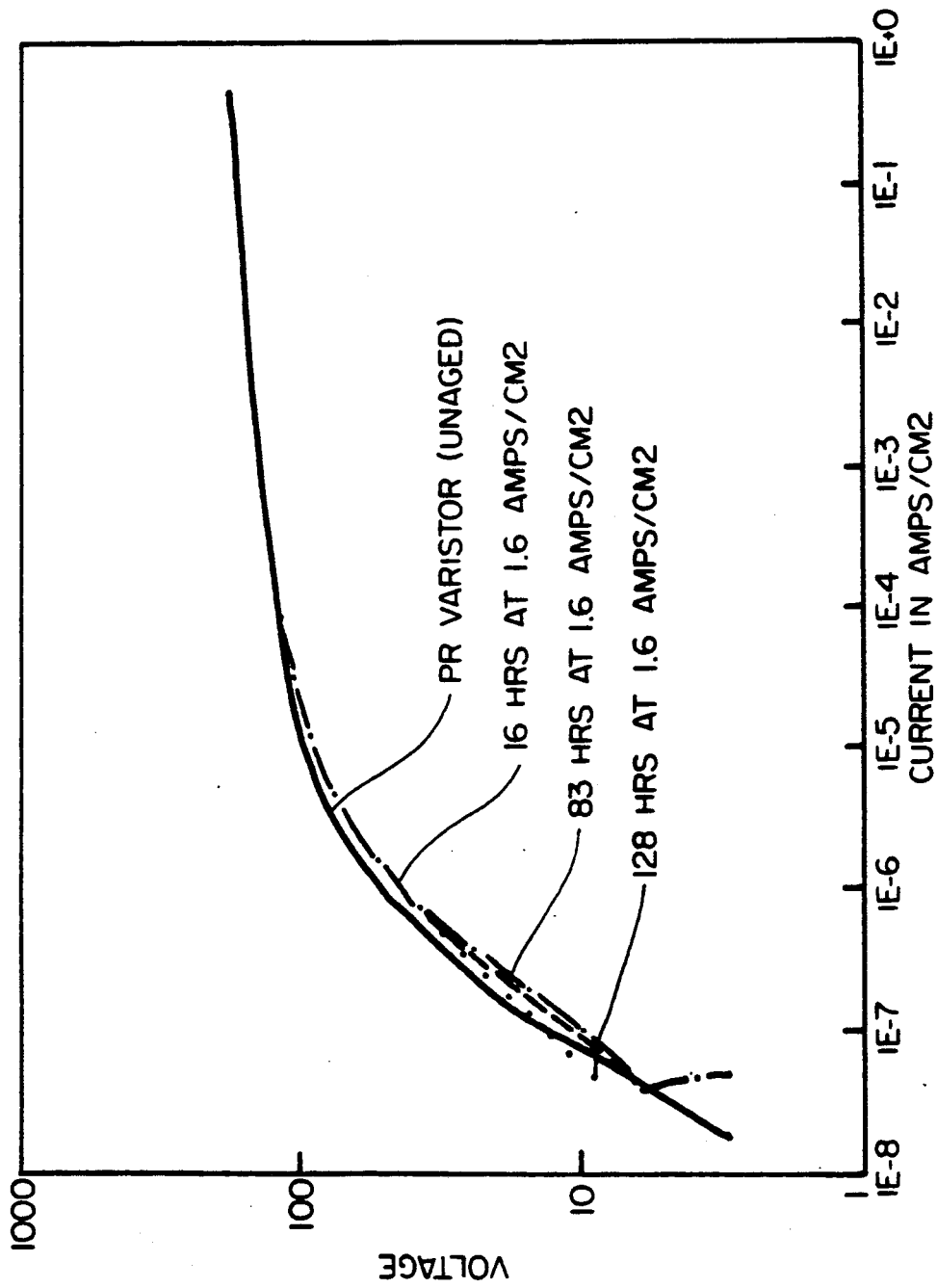
FIG_8a

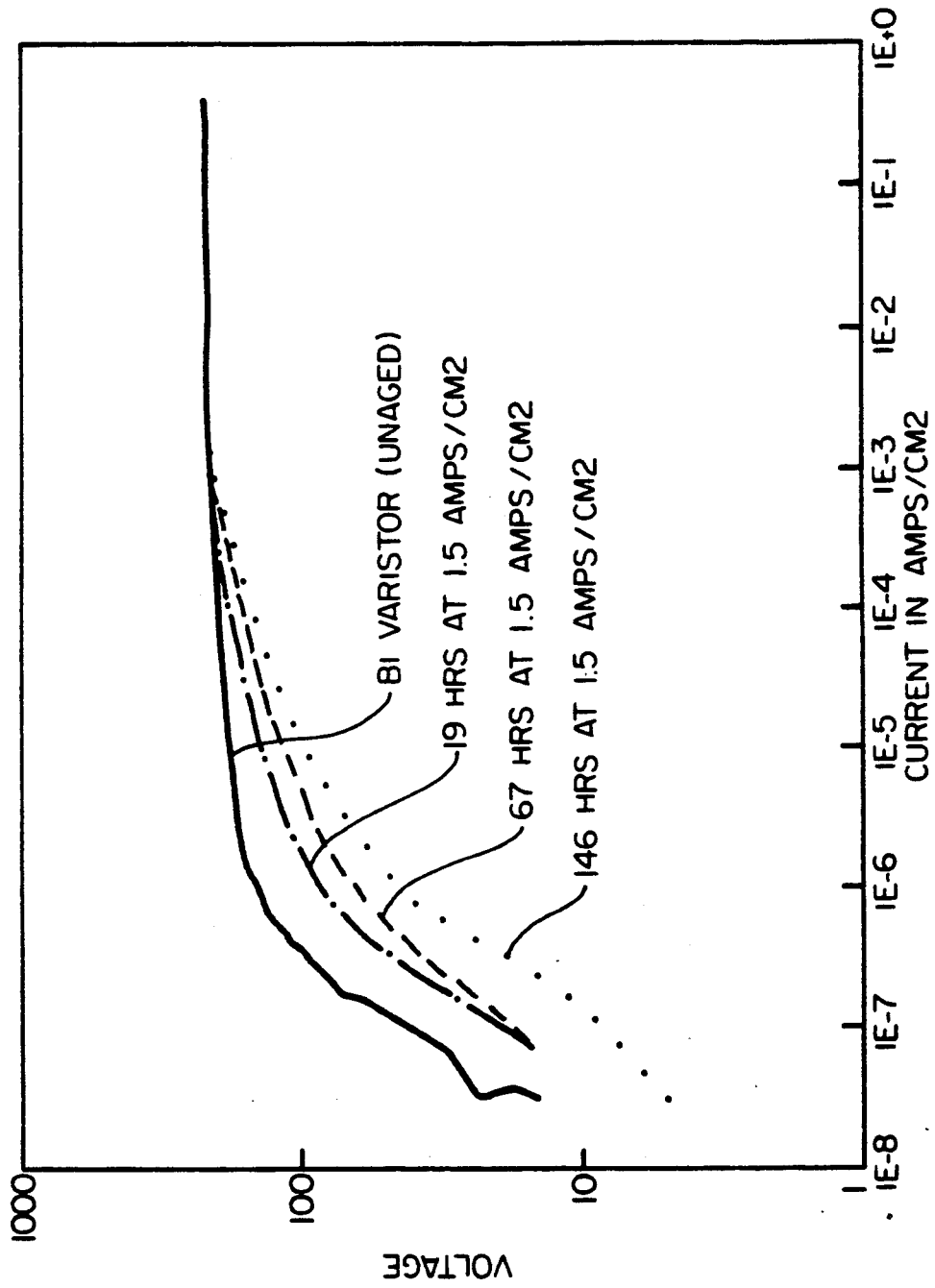
FIG_8b

VARISTOR DRIVEN LIQUID CRYSTAL DISPLAY

BACKGROUND OF THE INVENTION

This invention relates to liquid crystal displays wherein the pixels are controlled by varistors.

Various types of liquid crystal displays are known. The twisted nematic type relies on the ability of liquid crystals to rotate the polarization plane of incident light, thus causing the light to be absorbed or not by polarizers associated with the display. The encapsulated liquid crystal type relies on the ability of encapsulated liquid crystal material to switch from a state in which incident light is highly absorbed and/or scattered to one in which the light is substantially transmitted.

Where the display is used to depict simple alphanumeric characters, for example via the familiar seven-segment, figure-eight pattern found in calculators and watches, it is feasible to directly address each pixel in the display—that is, to provide each pixel with its own set of electrode leads. But where the display must depict complex images such as graphics or video images, a large number of pixels is required, and it becomes impractical to directly address each one. A display having pixels arranged in M rows and N columns has $M \times N$ pixels, thus requiring $M \times N$ sets of individual leads for direct addressing. As the pixel density and/or the size of the display increases, this number rapidly becomes unmanageable.

Multiplexing provides a method of addressing each pixel, but with a much lesser number of electrode leads. In its most elementary form, multiplexing uses a set of M row electrodes in conjunction with a set of N column electrodes. By applying the proper electrical signals to, for example, the 5th row and 8th column electrodes, the pixel at the 5th row and 8th column can be switched on and off. In this way, the number of electrode leads can be reduced from $M \times N$ to $M + N$. However, in this simplest form of multiplexing, the adjacent pixels are not independent of each other. When a voltage sufficient to switch the 5th row-8th column pixel is applied, the adjacent pixels (e.g., the 4th row-8th column pixel) also experiences a substantial voltage and can also be inadvertently switched, at least in part, leading to cross-talk between adjacent pixels.

It has been proposed to use a nonlinear electrical component, such as a metal-insulator-metal (MIM) diode or a thin film transistor (TFT) associated with each pixel to control the switching of each pixel and to eliminate cross-talk. Another nonlinear element is a varistor, which has a voltage-current relationship described by the equation $$I = \left[\frac{V}{C}\right]^\alpha$$

where I is the current flowing through the varistor; V is the voltage across the varistor; C is a constant which is a function of the dimensions, composition, and method of fabrication of the varistor; and $\alpha$ is a constant which is a measure of the nonlinearity of the varistor. A large $\alpha$, signifying a large degree of nonlinearity, is desirable. High quality varistors typically have an $\alpha$ between 20 and 50.

Varistors have also been proposed as the switching elements in liquid crystal displays. Castleberry, U.S. Pat. Nos. 4,233,603 (1980), and Hareng et al., 4,535,327 (1985) disclose the use of varistors in multiplexed liquid crystal displays. Yoshimoto et al., EP 337,711 (1989), disclose varistors as switching elements in multiplexed encapsulated liquid crystal displays.

The prior art varistor driven liquid crystal displays have several limitations. Liquid crystal displays operate at relatively low voltages, ranging from a few volts for the twisted nematic ones and from about 20 to about 100 volts for the encapsulated liquid crystal ones. For liquid crystal displays operating at video rates—for example in television sets—it is necessary to drive the pixels "off" to achieve rapid switching, instead of waiting for the natural decay to the "off" state according to the RC constants of the liquid crystal material. This can be effected only by matching $V_{on}$ (the voltage at which the pixel switches) with $V_t$ (the threshold voltage of a varistor, below which the varistor is highly resistive and above which the varistor's resistance drops dramatically). If one attempts to match $V_{on}$ and $V_t$ by increasing the thickness of a liquid crystal cell and thereby its operating voltage, a twisted nematic cell's response time increases, up to 3-4 fold, making this approach unsatisfactory for video rate applications. Conversely, if one attempts to reduce $V_t$ by reducing the thickness of the varistor, one runs into the problem of reproducibly making very thin varistor elements which tend to be fragile.

Levinson, in U.S. Pat. No. 4,364,021 (1982), discloses a varistor having a recessed region on one of its planar surfaces, to provide a region of reduced thickness and consequently lower breakdown voltage, while retaining the structural strength of a thicker varistor. However, Levinson relates to the preparation of individual varistors. For a multiplexed liquid crystal display, where a large array of varistors is required, one would then have to mount these individual varistors onto a supporting base, an inefficient step.

Kujawa et al., U.S. Pat. No. 3,195,091 (1965), discloses a silicon carbide non-linear resistor having plural leads attached to recesses on one surface thereof and a single lead attached to the other surface thereof.

Another critical requirement in varistor driven liquid crystal displays is that the varistor material be stable through a very large number of cycles—over billions of cycles. The prior art varistor-driven liquid crystal displays employ conventional varistor materials, most of which have been developed for applications such as surge arrestors, in which the number of on-off cycles above the threshold voltage is small.

SUMMARY OF THE INVENTION

In one aspect of the invention, there is provided a liquid crystal display, comprising
 (a) a first transparent base;
 (b) a plurality of first picture electrodes on the first transparent base;
 (c) a plurality of data lines for supplying electrical signals to the first picture electrodes;
 (d) a second transparent base, parallel to and spaced apart from the first transparent base;
 (e) a plurality of second picture electrodes on the second transparent base;
 (f) a plurality of varistor elements made of a varistor material comprising zinc oxide as a primary metal oxide and cobalt and praseodymium oxides as additive metal oxides, in amounts of between 0.1 and 8.0 atom % cobalt and between 0.08 and 8.0 atom % praseodymium, one varistor element being associated with and in electrical contact each second picture electrode;

(g) a plurality of scan lines for supplying electrical signals to the second picture electrodes via the respective associated varistor elements; and (h) electrooptically active liquid crystal material between the first and second picture electrodes.

In another aspect of the invention, there is provided a liquid crystal display comprising:

(a) a first transparent base;

(b) a plurality of first picture electrodes on the first transparent base;

(c) a plurality of data lines for supplying electrical signals to the first picture electrodes;

(d) a second transparent base, parallel to and spaced apart from the first transparent base;

(e) a plurality of second picture elements on the second transparent base;

(f) a plurality of varistor elements in the form of a varistor array comprising an integral body of varistor material having two major opposing faces, one of the opposing faces having an array of indentations thereon, each indentation defining a varistor element, one varistor element being associated with and in electrical contact with each second picture electrode;

(g) a plurality of scan lines for supplying electrical signals to the second picture electrodes via the respective associated varistor elements; and (h) encapsulated liquid crystal material between the first and second picture electrodes.

In yet another aspect of the invention, there is provided a liquid crystal display, comprising (a) a first transparent base;

(b) a plurality of first picture electrodes on the first transparent base;

(c) a plurality of data lines for supplying electrical signals to the first picture electrodes;

(d) a second transparent base, parallel to and spaced apart from the first transparent base;

(e) a plurality of second picture electrodes on the second transparent base;

(f) a plurality of varistor elements, one varistor element being associated with and in electrical contact with each second picture electrode;

(g) a plurality of scan lines for supplying electrical signals to the second picture electrodes via the respective associated varistor elements;

(h) electrooptically active material comprising encapsulated liquid crystal material between the first and second picture electrodes; and (i) a plurality of reflector elements, one reflector element being associated with and positioned behind each second picture electrode.

BRIEF DESCRIPTION OF THE DRAWING(S)

FIGS. 1-3 show in cross-section preferred embodiments of the invention.

FIGS. 4a-b show in cross section preferred varistor arrays for use in displays of this invention.

FIG. 5 shows the waveform for a video aging signal for testing the stability of varistors used in this invention.

FIGS. 6a and 6b compare the stability of praseodymium and bismuth doped varistors.

FIG. 7 shows schematically a set-up for performing stability tests on varistors in conjunction with an encapsulated liquid crystal cell.

FIGS. 8a and 8b compare the stabilities of praseodymium and bismuth doped varistors when used to drive an encapsulated liquid crystal display cell.

DESCRIPTION OF THE PREFERRED EMBODIMENTS

A preferred liquid crystal material for displays is encapsulated liquid crystal material, whose preparation is disclosed in U.S. Pat. Nos. 4,435,047 (1984), 4,606,611 (1986), 4,616,903 (1986), and 4,707,080 (1987), all to Fergason; published European patent application EP 156,615 (1985), by Pearlman et al.; U.S. Pat. Nos. 4,671,618 (1987), to Wu et al.; 4,673,255 (1987) and 4,685,771 (1987), to West et al.; and 4,688,900 (1987) to Doane et al.; the disclosures of each which are incorporated herein by reference. In encapsulated liquid crystal material, discrete volumes of liquid crystals are encapsulated, dispersed, embedded or otherwise contained in a containment medium or matrix. "Liquid crystals" denotes a composition having liquid crystalline properties, whether that composition is a single discrete liquid crystalline compound, a mixture of different liquid crystalline compounds, or a mixture of liquid crystalline and non-liquid crystalline compounds.

Liquid crystals have typically elongated molecular shapes, with a tendency to align or orient themselves with their long molecular axes parallel to each other. This alignment causes liquid crystals to be anisotropic, meaning that their measured physical, optical, and other properties are dependent on the direction of measurement (parallel or perpendicular to the direction of alignment). Further, the alignment direction can be influenced by an external stimulus, such as an electrical or magnetic field, causing the liquid crystals to exhibit a particular value of a physical characteristic in one direction when the stimulus is absent, but rapidly switching to a different value when the stimulus is applied. It is because of their anisotropy and their ready realignment that liquid crystals are useful as materials for displays.

The containment medium is preferably a polymeric material. Suitable containment media include but are not limited to poly(vinyl alcohol), polyurethane, acrylic and methacrylic polymers and copolymers, epoxies, polyolefins, vinyl polymers, and the like.

Encapsulated liquid crystal material can be formed by deposition from an emulsion containing both the containment medium and liquid crystals or by the evaporation of liquid from a solution containing both containment medium and liquid crystals. It can also be formed by making an initially homogeneous mixture containing both containment medium and liquid crystals at an elevated temperature, then cooling to phase-separate out liquid crystal volumes contained in the containment medium. Further, it can be formed by an in-situ polymerization process, in which the containment medium is polymerized and simultaneously encapsulates liquid crystal material. The liquid crystal need not be entirely surrounded by the polymer, and may exist as part of a system with co-continuous phases.

Typically, encapsulated liquid crystal material is substantially non-transparent in the absence of a sufficient electric field (the "field-off" state) and substantially transparent in the presence of a sufficient electric field (or "field-on" state). The electric field induces a change in the alignment of the liquid crystals, in turn causing the encapsulated liquid crystal material to switch from a highly light-scattering (and/or absorbent) state to a highly non-scattering and substantially transparent state. Generally, it is preferred that the liquid crystals have a positive dielectric anisotropy and that the ordinary index of refraction of the liquid crystals be matched with the refractive index of the containment medium, while the extraordinary index of refraction is substantially mismatched therewith. The physical principles by which such encapsulated liquid crystal material operates is described in further detail in the aforementioned references, particularly the patents to Fergason. In those portions of the encapsulated liquid crystal material to which a sufficient electric field is applied, the transition from a non-transparent state to a transparent state occurs, while adjacent areas to which no electric field has been applied remain non-transparent.

Pleochroic dyes have been mixed with liquid crystals to form a solution therewith. The molecules of pleochroic dyes generally align with the molecules of liquid crystals, so that the application of the electric field affects not only the predominant alignment of the liquid crystals, but also of the pleochroic dye. As the extent of the absorption of incident light by the pleochroic dye depends on its orientation relative to the incident light, the application of an external stimulus to a liquid crystal-pleochroic dye combination also provides a means for the controlled attenuation of light. (Thus, as used herein, the term "liquid crystals" also means, in context, liquid crystals containing pleochroic dye dissolved therein.) Pleochroic dyes may be used in encapsulated liquid crystals to form colored displays. Thus, a display capable of displaying colored images can be formed by depositing side by side red, blue, and green pixels.

Turning now to the figures, FIG. 1-3 show in cross section a two-pixel segment of three preferred embodiments of the invention. In these Figures, like numerals designate like parts. In FIG. 1, display 20 comprises two halves, a top half 20a and a bottom half 20b, which are conveniently fabricated separately and then assembled, being held together by adhesive 21. Top half 20a comprises encapsulated liquid crystal material 25 sandwiched between top and bottom support materials 26 and 27, respectively, each of which can be made of a transparent polymer such as poly(ethylene terephthalate), available commercially under the tradename Mylar. Top support material 26 has deposited thereon a top picture electrode 28, which is connected to external circuitry (not shown) by data line 29, for addressing purposes. Bottom support material 27 has deposited thereon a bottom picture electrode 30. Electrodes 28 and 30 can be made of a transparent conductive material, such as indium tin oxide. The overlap of electrodes 28 and 30 defines pixel 31, as indicated by reference lines a and b. A backplane via 32, extends through bottom support material 27, for providing an electrical connection to bottom electrode 30. A reflector 33 reflects light transmitted by pixel 31 back to a viewer, when the pixel is in its transmissive state. For a colored display, the reflectors can be of different colors, for example red, blue, and green, to form red, blue and green pixels, respectively.

Half 20b comprises an array of varistor elements 37 on an integral slab 35 of varistor material. Slab 35 has a plurality of indentations or recesses 36 therein, each defining a varistor element 37, as shown by reference lines c and d. Each recess 36 is filled with a first conductor 38. On the opposite side of varistor slab 35 there is associated with each varistor element 37 a second conductor 39. The varistor action (i.e. the threshold voltage $V_t$) is defined by the thickness e of varistor material between conductors 38 and 39. Thickness e can be relatively thin, causing the varistor element to have a low threshold voltage (ca. 50–80volts), as is desirable for controlling encapsulated liquid crystal cells. At the same time, the overall thickness f of varistor slab 35 can be fairly thick, so that it has the requisite mechanical strength. An electrically conductive adhesive 40 brings varistor element 37 into electrical contact with pixel 31, and also helps to hold halves 20a and 20b together. A dielectric layer 41 separates varistor slab 35 from the adhesive 21. Scan line 42 provides a connection between varistor 37 and external circuitry (not shown). Base material 43, made for example of glass, provides physical support. Thus, by applying the appropriate electrical signals (discussed in more detail hereinbelow) to data and scan lines 29 and 42, pixel 31 can be driven, with varistor element 37 serving to prevent cross-talk between it and adjacent pixels.

In FIG. 2, another preferred embodiment is shown. This embodiment display 50 also comprises two halves, a top half 50a and a bottom half 50b, but differs from the display 20 depicted in FIG. 1 in that reflector 51 is associated with the bottom half 50b (compared with corresponding reflector 33 in FIG. 1) and the adhesive 52 used bond top and bottom halves 50a and 50b together is thicker than reflector 51, so that there will be a gap between reflector 51 and bottom support material 27 when the two halves are joined together. Reflector 51 may be achromatic or colored, depending on whether display 50 is a color or a monochrome display. The gap is advantageous because it leads to a brighter display by avoiding pseudomultiple passes of light through encapsulated liquid crystal material 25. The refractive index of the medium filling the gap is desirably as small as possible, with air (the most practical medium) having also the lowest practically attainable refractive index of about 1.0. The gap is preferably at least twice as wide as the wavelength of the incident light, but less than 1/10 the size of the smallest feature in the display, to avoid parallax effects. For example, if the display has 100 mil pixels, the gap should be narrower than 10 mils.

FIG. 3 shows yet another embodiment. Display 60 also comprises two halves, a top half 60a and a bottom half 60b. In FIG. FIG. 3 as in FIG. 2, adhesive 52 is thicker than reflector 61, to provide an air gap between reflector 61 and bottom support material 27 after the two halves have been mated. However, reflector 61 is achromatic, and any colored effects are provided by optically coupled colored filters 62.

Additionally, it is possible to use a hybrid structure, combining the colored reflectors such as in FIG. 1 with optically coupled filters as in FIG. 3. We have discovered that certain constructions are better with particular colors, so that a hybrid device using colored reflectors for a particular color and optically coupled filters for another color results in improved brightness and contrast compared to a device of a single type of construction. Thus, we have found that the best results for a given set of color coordinates in a CIE diagram are achieved with red fluorescent reflectors (for the red pixels) and optically coupled blue and green filters (for the blue and green pixels).

A preferred varistor array for this ivnention comprises an integral body of varistor material having two major opposing faces, at least one of the opposing faces having an array of indentations thereon. FIG. 4a shows the embodiment in which only one of the faces of integral varistor material 70 has indentations thereon. Each of the indentations defines a varistor element in the array, permitting the array to be a self-supporting, rugged article, but yet also permitting the varistor elements to be sufficiently thin and thereby have sufficiently low switching voltages. Electrodes 71a–d and 72a–d are used to connect each varistor element to external circuitry, not shown. The thickness (and hence the threshold voltage of the varistor element) is determined by the overall thickness of the integral varistor material 70 less the depth of the indentation. FIG. 4b shows an alternative embodiment in which both faces of integral varistor material 75 have indentations thereon, each indentation on one face being in registration with a corresponding indentation on the other face, so that the thickness of a varistor element (and its threshold voltage) is defined by the overall thickness of integral varistor material 75 less the depths of the two opposed indentations.

A varistor array such as that of FIG. 4a can be made via the steps of (a) providing a first green sheet comprising a varistor precursor material; (b) providing a second green sheet comprising a varistor precursor material and having an array of openings extending across the thickness thereof; (c) laminating the second green sheet to the first green sheet to form a laminate of the first and second green sheets; and (d) sintering the laminate to convert the varistor precursor material in the first and second green sheets to varistor material. A varistor array such as that of FIG. 4b can be made via the steps of; (a) providing a first green sheet comprising a varistor precursor material; (b) providing a second and a third green sheet, each comprising varistor precursor material and having an array of openings extending across the thickness thereof; (c) laminating the first, second and third green sheets to form a laminate of the first, second, and third green sheets, such that the first green sheet is sandwiched between the second and third green sheets and the openings in the second sheet are in registration with the openings in the third sheet; and (d) sintering the laminate to convert the varistor precursor material to varistor material. These methods are described in more detail in copending commonly assigned application of Thompson et al., Ser. No. 07/520,590, filed May 8, 1990, the disclosure of which is incorporated herein by reference.

In turn, the varistor precursor material can be made in any number of ways. Thompson et al, WO 88/02921 (1988), the disclosure of which is incorporated herein by reference, disclose a precipitation process for the preparation of a varistor precursor material comprising a primary metal oxide and one or more additive metal oxides by:

(a) forming an aqueous solution comprising up to about 25 mole % (based on additive metal oxide plus primary metal oxide) of at least one soluble precursor of an additive metal oxide;

(b) mixing in the aqueous solution up to about 75 mole % of at least one primary metal oxide powder having an average particle size up to about 5 microns to form a suspension or slurry of the primary metal oxide powder in the solution;

(c) adding to the suspension or slurry a sufficient amount of a precipitation reagent to cause one or more of the dissolved additive metal oxide precursors to convert to an oxide or hydrous oxide and precipitate from the solution in the presence of the primary metal oxide powder in the form of an oxide or hydrous oxide;

(d) removing water and by-product salts from the suspension of primary metal oxide powder and precipitate of additive metal oxide or hydrous oxide; and (e) drying the powder and precipitate and forming a metal oxide varistor powder.

Additional methods of preparing a varistor precursor material and varistor material therefrom are disclosed by Gupta et al., U.S. Pat. No. 4,094,061 (1978); Wong et al., U.S. Pat. No. 4,142,996 (1979); Douglas et al., U.S. Pat. No. 4,023,961 (1977); Pallila, U.S. Pat. No. 4,575,440 (1986); Lauf, U.S. Pat. No. 4,510,112 (1985); Kanai et al., U.S. Pat. No. 4,540,971 (1985); Brooks et al., U.S. Pat. No. 4,681,717 (1987); Osman et al., U.S. Pat. No. 4,767,729 (1988); and Eda et al., U.S. Pat. No. 4,551,268 (1985).

The green sheets can comprise additives such as plasticizers, solvents, binders, dispersants, surfactants, and the like, which normally can be used in making the green body. Typical suitable plasticizers include glycols (e.g., polypropylene glycol), phthalate esters (e.g., dioctyl phthalate and benzyl butyl phthalate), and long chain carboxylic acids (e.g., oleic and stearic acid), and mixtures thereof. Typical suitable binders include cellulose esters, long chain thermoplastic polymers such as poly(vinylbutyral), poly(vinyl acetate), and polyemethyl methacrylate). Typical suitable surfactants include amine salts of alkyl aryl sulfonates, alkyl ethers of poly(ethylene glycol) such as the ethyl ether thereof, alkyl aryl polyether alcohols such as ethylphenyl glycol, polyoxyethylene acetate, and the like. Preferred additives are those which volatilize during the sintering process. Alternatively, the additives may be removed by a solvent extraction or leaching process.

The varistor precursor powder is converted to varistor material by sintering at a temperature between about 750° and 1500° C., preferably between about 900° and about 1100° C., depending on composition, grain size, and other characteristics desired in the resulting varistor material. The sintering process may be according to a schedule whereby the temperature is gradually increased, with pauses at predetermined temperatures along the way.

Alternatively, the varistor elements may be discrete elements, prepared from a precursor paste, such as disclosed in the aforementioned Yoshimoto et al. European application. Zinc oxide containing a dopant or additive metal oxide is molded into pellets and sintered at a temperature between 700° and 1300° C. A binder, which may be inorganic (e.g., glass) or organic (e.g., cellulosic materials, polyvinyl alcohol) to form a printable paste. The paste is applied to a base having the desired electrode pattern and solidified, with heating if desirable or necessary, depending on the binder used.

For a display, it is essential that the varistor element be stable through a large number of cycles—that is, the nonlinear voltage current characteristics of the varistor material should not degrade after the varistor has been repeatedly taken to a voltage above and then below the switching voltage. Conventional varistors, typically of the zinc oxide/bismuth oxide type, show increases in leakage current, changes in the switching voltage, and decreases in the coefficient $\alpha$ after only several million switching cycles over a four hour period. We have discovered that varistors based on zinc oxide, cobalt oxide, and praseodymium oxide are much stabler and preferable for driving liquid crystal displays. Preferably the varistor comprises zinc oxide as a primary metal oxide and cobalt and praseodymium oxides as additive metal oxide, in amounts of between 0.1 and 8.0 atom % cobalt and between 0.08 and 8.0 atom % praseodymium, each calculated as cobalt and praseodymium. More preferably, such varistors further comprise aluminium oxide in an amount of between 5 and 200 ppm Al (calculated as aluminum). The praseodymium oxide may used in any one of its various forms, which may be generically represented by the formula $PrO_x$, where x is between 1 and 2, for example $Pr_2O_3$, $Pr_6O_{11}$, or $PrO_2$. Instead of praseodymium oxide, terbium oxide may be used. Praseodymium varistors can be made by a coprecipitation process as disclosed in the aforementioned WO 88/02921. Praseodymium varistors and methods thereof are also disclosed in Nagasawa et al., U.S. Pat. No. 4,033,906 (1977). Preferably, the threshold voltages of the varistors are between about 20 and about 80 volts.

The unexpected stability of varistors comprising praseodymium oxide is shown in the following examples, which are provided by way of illustration and not limitation.

EXAMPLE 1

A zinc oxide varistor having praseodymium oxide as an additive metal oxide (0.5 atom % Pr, 2 atom % Co, 40 ppm Al and 97.5 atom % Zn) and another zinc oxide varistor having bismuth oxide as an additive metal oxide (1 atom % Bi, 1 atom % Co, 15 ppm Al, 0.5 atom % Sb, 0.25 atom % Mn, 0.25 atom % Cr) were video aged for approximately 160 hours at 1 amp/cm². The video aging signal consisted of a bipolar 60 μsec square wave pulse every 1.5 msec (FIG. 5), with a voltage sufficient to provide 1 amp current through a 1 cm² silver electrode painted on each varistor. Each varistor was subjected to this aging signal continuously for one second every 10 seconds (10% duty cycle).

The results are provided in FIG. 6a and 6b, for the praseodymium and the bismuth varistor, respectively. Although both samples show some initial current voltage degradation, the praseodymium sample is clearly superior, both in the extent of initial degradation and in the subsequent degradation as the test progresses. In contrast, the bismuth varistor sample showed continuous degradation over time.

EXAMPLE 2

A praseodymium doped (0.5 atom % Pr, 1 atom % Co, 50 ppm Al) and a bismuth doped (1 atom % Bi, 1 atom % Co, 10 ppm Al, 0.5 atom % Sb, 0.25 atom % Mn, 0.25 atom % Cr) zinc oxide varistor were each video aged in conjunction with a 0.5 in² encapsulated liquid crystal cell and a 10 kΩ resistor connected in series. FIG. 7 shows schematically this set-up. A power source 80 was used to drive varistors 81a–d, connected in series with a 10 kΩ resistor 82 and liquid crystal cell 83, which may be viewed electrically as the combination of a resistor 83a and a capacitor 83b. The video aging signal consisted of a bipolar 300 μsec square wave pulse every 1.2 msec, with each sample subjected to this signal continuously for 1 second every 10 seconds (10% duty cycle). The current density was about 1.6 amp/cm² for the praseodymium doped varistor and 1.5 amp/cm² for the bismuth doped varistor.

The results are provided in FIGS. 8a and 8b for the praseodymium and bismuth doped varistors, respectively. The results are very similar to those obtained in Example 1—again the praseodymium varistor showed much lesser initial degradation and also much lesser degradation as the test progressed. Our varistors, after 100 hr of exposure to the aging signal of FIG. 5, show an increase in leakage current (measured at 80% of the threshold voltage) of less than ten-fold.

We claim:

1. A liquid crystal display, comprising
   (a) a first transparent base;
   (b) a plurality of first picture electrodes on the first transparent base;
   (c) a plurality of data lines for supplying electrical signals to the first picture electrodes;
   (d) a second transparent base, parallel to and spaced apart from the first transparent base;
   (e) a plurality of second picture electrodes on the second transparent base;
   (f) a plurality of varistor elements made of a varistor material comprising zinc oxide as a primary metal oxide and aluminum, cobalt and praseodymium oxides as additive metal oxides, in amounts of between 5 and 200 ppm aluminum, between 0.1 and 8.0 atom % cobalt and between 0.08 and 8.0 atom % praseodymium, one varistor element being associated with and in electrical contact with each second picture electrode;
   (g) a plurality of scan lines for supplying electrical signals to the second picture electrodes via the respective associated varistor elements; and
   (h) electrooptically active liquid crystal material between the first and second picture electrodes.

2. A liquid crystal display according to claim 1, wherein the liquid crystal material comprises encapsulated liquid crystal material.

3. A liquid crystal display according to claim 1, wherein the varistor elements have a threshold voltage of between about 20 and about 80 volts.

4. A liquid crystal display according to claim 1, wherein the electrical contact between each varistor element and the second picture electrode associated therewith is provided by electrically conductive adhesive.

5. A liquid crystal display comprising:
   (a) a first transparent base;
   (b) a plurality of first picture electrodes on the first transparent base;
   (c) a plurality of data lines for supplying electrical signals to the first picture electrodes;
   (d) a second transparent base, parallel to and spaced apart from the first transparent base;
   (e) a plurality of second picture elements on the second transparent base;
   (f) a plurality of varistor elements in the form of a varistor array comprising an integral body of varistor material having two major opposing faces, one of the opposing faces having an array of indentations thereon, each indentation defining a varistor element, one varistor element being associated with and in electrical contact with each second picture electrode, the varistor material comprising zinc oxide as a primary metal oxide and aluminum, cobalt, and praseodymium oxides as additive metal oxides, in amounts between 5 and 200 ppm aluminum, 0.1 and 8.0 atom % cobalt, and 0.08 and 8.0 atom % praseodymium;
   (g) a plurality of scan lines for supplying electrical signals to the second picture electrodes via the respective associated varistor elements; and
   (h) encapsulated liquid crystal material between the first and second picture electrodes.

6. A liquid crystal display according to claim 5, wherein the varistor elements have a threshold voltage of between about 20 and about 80 volts.

7. A liquid crystal display according to claim 5, wherein the electrical contact between each varistor element and the second picture electrode associated therewith is provided by electrically conductive adhesive.

8. A liquid crystal display, comprising
(a) a first transparent base;
(b) a plurality of first picture electrodes on the first transparent base;
(c) a plurality of data lines for supplying electrical signals to the first picture electrodes;
(d) a second transparent base, parallel to and spaced apart from the first transparent base;
(e) a plurality of second picture electrodes on the second transparent base;
(f) a plurality of varistor elements, one varistor element being associated with and in electrical contact with each second picture electrode;
(g) a plurality of scan lines for supplying electrical signals to the second picture electrodes via the respective associated varistor elements;
(h) electrooptically active material comprising encapsulated liquid crystal material between the first and second picture electrodes; and
(i) a plurality of reflector elements, one reflector element being associated with and positioned behind each second picture electrode, each reflector element being spaced apart from the second picture electrode associated therewith.

9. A liquid crystal display according to claim 8, wherein the reflector elements are achromatic, and further comprising an optically coupled colored filter associated with each reflector.

10. A liquid crystal display according to claim 8, which is a colored reflector having red, blue, and green pixels, wherein the red pixels are defined by fluorescent red reflector elements and the blue and green pixels are defined by achromatic reflector elements having associated therewith blue and green filters, respectively.

11. A liquid crystal display according to claim 8, 9, or 10, wherein the varistor material forming the plurality of varistor elements comprises zinc oxide as a primary metal oxide and cobalt and praseodymium oxides as additive metal oxides, in amounts of between 0.1 and 8.0 atom % cobalt and between 0.08 and 8.0 atom % praseodymium.

12. A liquid crystal display according to claim 11, wherein the varistor material further comprises aluminum oxide in an amount of between 5 and 200 ppm aluminum.

13. A liquid crystal display according to claim 8, 9, or 10, wherein the plurality of varistor elements is in the form of a varistor array comprising an integral body of varistor material having two major opposing faces, one of the opposing faces having an array of indentations thereon, each indentation defining a varistor element.

14. A liquid crystal display according to claim 8, 9, or 10, wherein the varistor elements have a threshold voltage of between about 20 and about 80 volts.

15. A liquid crystal display according to claim 8, 9, or 10, wherein the electrical contact between each varistor element and the second picture electrode associated therewith is provided by electrically conductive adhesive.

* * * * *

UNITED STATES PATENT AND TRADEMARK OFFICE
CERTIFICATE OF CORRECTION

PATENT NO. : 5,124,822

INVENTOR(S) : Becker et al.

DATED : June 23, 1992

It is certified that error appears in the above-identified patent and that said Letters Patent is hereby corrected as shown below:

```
    Cover Page, References Cited [56], in the U.S. Patent
Documents section, add the following references:
        4,233,603      1980      Castleberry
        4,535,327      1985      Hareng et al.
        4,364,021      1982      Levinson
        3,195,091      1965      Kujawa et al.
and in the Foreign Patent Documents section, add the following:
        8,802,921      1988      PCT Application
        337,711        1989      European Cover Page, Abstract [57], line 14, after "contact" insert
--with--.

Column 3, line 2, after "contact" insert --with--.

Column 6, line 3, replace "80volts" by --80 volts--.

Column 6, line 45, delete the second occurrence of "Fig.".

Column 9, line 6, after "may" insert --be--.
```

Signed and Sealed this

Third Day of January, 1995

*Attest:*

BRUCE LEHMAN

*Attesting Officer*   Commissioner of Patents and Trademarks